United States Patent [19]

Yamamoto

[11] Patent Number: 5,153,626
[45] Date of Patent: Oct. 6, 1992

[54] LENS BARREL RETRACTING DEVICE FOR CAMERA

[75] Inventor: Harishige Yamamoto, Kanagawa, Japan

[73] Assignee: Canon Kabushiki Kaisha, Tokyo, Japan

[21] Appl. No.: 759,956

[22] Filed: Sep. 17, 1991

Related U.S. Application Data

[63] Continuation of Ser. No. 623,761. Dec. 6, 1990, abandoned.

[30] Foreign Application Priority Data

Dec. 8, 1989 [JP] Japan .................................. 1-320128
Dec. 8, 1989 [JP] Japan .................................. 1-320129
Dec. 8, 1989 [JP] Japan .................................. 1-320130

[51] Int. Cl.⁵ ............................................. G03B 17/04
[52] U.S. Cl. ................................ 354/187; 354/195.12; 359/700
[58] Field of Search ............ 354/195.1, 195.12, 400; 359/676, 694, 695, 696, 697, 698, 699, 700, 701, 705, 706, 823, 826

[56] References Cited

U.S. PATENT DOCUMENTS 4,827,296 5/1989 Haraguchi et al. ............... 354/187

Primary Examiner—L. T. Hix
Assistant Examiner—Howard B. Blankenship
Attorney, Agent, or Firm—Fitzpatrick, Cella Harper & Scinto

[57] ABSTRACT

A lens barrel retracting device for a camera comprises a first optical system holding part which is arranged to carry a first photo-taking optical system and to be capable of retracting and displacing the first photo-taking optical system relative to the camera body; a second optical system holding part which is arranged to displaceably carry a second photo-taking optical system and to be displaceable together with the first optical system holding part; a third optical system holding part which is arranged to displaceably carry a third photo-taking optical system and to be displaceable together with the second optical system holding part; and an operating member which is arranged to cause the first optical system holding part to be retracted and displaced and to cause the second and third photo-taking optical systems to be displaced relative to the second and third optical system holding parts respectively to perform a retracting action.

18 Claims, 16 Drawing Sheets

LENS BARREL RETRACTING DEVICE FOR CAMERA

This application is a continuation of application Ser. No. 07/623,671 filed Dec. 6, 1990, now abandoned.

BACKGROUND OF THE INVENTION

1. Field of the Invention

This invention relates to a lens barrel retracting device which is capable of stowing a lens barrel into a camera body in a very compact state and more particularly to a lens barrel retracting device suited for a compact zoom camera.

2. Description of the Related Art

In positioning the front and rear lens groups of a photo-taking optical system for continuously changing the focal length of the system, the conventional compact zoom camera has been arranged to perform zooming by restricting their positions with a cam ring 201 and a straight movement cam 202 as shown in FIG. 18 of the accompanying drawings. In retracting the lens barrel 203 of an optical system, which is shown in a wide-angle position in FIG. 18, the cam ring 201 is caused to further rotate from its wide-angle position until the tip of the lens barrel 203 comes to be flush with the fore end part of a cover 204.

However, the conventional lens barrel retracting arrangement has presented the following problems:

(i) The arrangement of the cam ring provided for restricting the positions of the front and rear lens groups of the photo-taking optical system necessitates the barrel retraction to be carried out with the photo-taking optical system in the wide-angle position, in which some interval space is left between the front and, rear lens groups. This space causes an increase in the thickness of the camera in the state of having the lens barrel retracted.

(ii) The space left between the front and rear lens groups at the time of lens barrel retraction may be shortened by providing, as shown in FIG. 19, a cutout part 201a in a part extending the wide-angle end 201b of the cam slot of the cam ring 201 which is arranged to restrict the position of the rear lens group. However, although the space between the front and rear lens groups can be shortened by the provision of the cutout part 201a, this brings about no substantial change in length of the cam ring 201 in the direction of an optical axis, as shown in FIG. 20. Therefore, the desired reduction in the thickness of the camera in the lens-barrel-retracted state is still hindered by the length of the cam ring 201. Nevertheless, the thickness of the camera is not much changed from the thickness mentioned in Para. (i) above.

(iii) FIG. 21 shows an attempt to increase the lens barrel retracting degree. In this case, another cam ring 205 and another straight movement cam 206 are arranged on the periphery of the straight movement cam 202 to engage a pin 207 provided on the straight movement cam 202. This arrangement enables the whole lens barrel to be retracted by rotating the cam ring 205. However, this arrangement necessitates the addition of the cam ring 205 and the straight movement cam 206, which increases the size of the lens barrel part of the camera. As a result, the camera becomes larger as a whole.

(iv) Further, according to the above-stated method, a zooming power transmission gear 208 must be arranged in a position not to interfere with the movement of the cam ring 205 and the straight movement cam 206, as shown in FIG. 21. To meet this requirement, the external cover 209 of the camera must be set in a further forward position. Therefore, the method of using the lens barrel retracting cam ring 205 and the straight movement cam 206 not only fails to sufficiently reduce the thickness of the camera but also merely results in a more complex mechanism.

(v) Further, in order that a peripheral gear part 201c of the cam ring 201 which is arranged as shown in FIG. 22 to engage the above-stated gear 208 for zooming is positioned not to interfere with the inner circumferential part of the above-stated straight movement cam 206, the cam 206 and the cam ring 205 must be arranged to have large diameters. However, that arrangement increases the size of the camera.

(vi) In order that the above-stated gear 208 is kept in a state of engaging the gear part 201c when the lens barrel is retracted, it is necessary to extend the gear part 201c of the cam ring 201 as indicated by a part 201d in FIG. 22. However, the extended gear part 201d must be covered with the external cover 209 of the camera in such a way as to prevent it from being exposed to the outside even when the gear part 201d is drawn out and forward from the lens barrel retracted position. This requires a larger outside diameter of the lens barrel cover.

(vii) If the cam ring 201 is exposed to the outside when the lens barrel is drawn out from its retracted position, the cam slot of the cam ring 201 would also be exposed. This is not only detrimental to the appearance of the camera but also might incur a leak of light from the cam slot. To prevent this, the external cover 209 must be provided with an extension part 209a covering the cam ring 201 and the straight movement cam 202 even when the lens barrel is drawn out from its retracted position, as shown in FIG. 22. To meet that requirement, the camera must be designed to have a larger thickness than the conventional product although the lens barrel can be completely retracted.

SUMMARY OF THE INVENTION

This invention is directed to the solution of the above-stated problems. It is, therefore, a principal object of the invention to provide a lens barrel retracting device which is capable of compactly stowing the lens barrel into the camera body and permits reduction in the thickness and size of the camera.

To attain the above-stated object, a lens barrel retracting device for a camera arranged in accordance with this invention comprises: a first optical system holding part which is arranged to carry a first photo-taking optical system and to be capable of retracting and displacing the first photo-taking optical system relative to a camera body; a second optical system holding part which is arranged to displaceably carry a second photo-taking optical system and to be displaceable together with the first optical system holding part; a third optical system holding part which is arranged to displaceably carry a third photo-taking optical system and to be displaceable together with the second optical system holding part; and operating means which is arranged to retract and displace the first optical system holding part and to displace the second and third photo-taking optical systems relative to the second and third optical system holding parts respectively to perform a retracting operation.

Further, to attain the above-stated object, the lens barrel retracting device for a camera according to this invention is arranged in such a way that a driving force for retracting the lens barrel is transmitted on the inner side of the outside diameter of the lens barrel.

The above and other objects and features of this invention will become apparent from the following detailed description of embodiments thereof taken in connection with the accompanying drawings.

DETAILED DESCRIPTION OF THE PREFERRED EMBODIMENTS

The following describes embodiments of the invention with reference to the drawings, wherein FIGS. 1 through 12 show a zoom lens barrel arranged according to this invention as a first embodiment of the invention.

Figure 1:
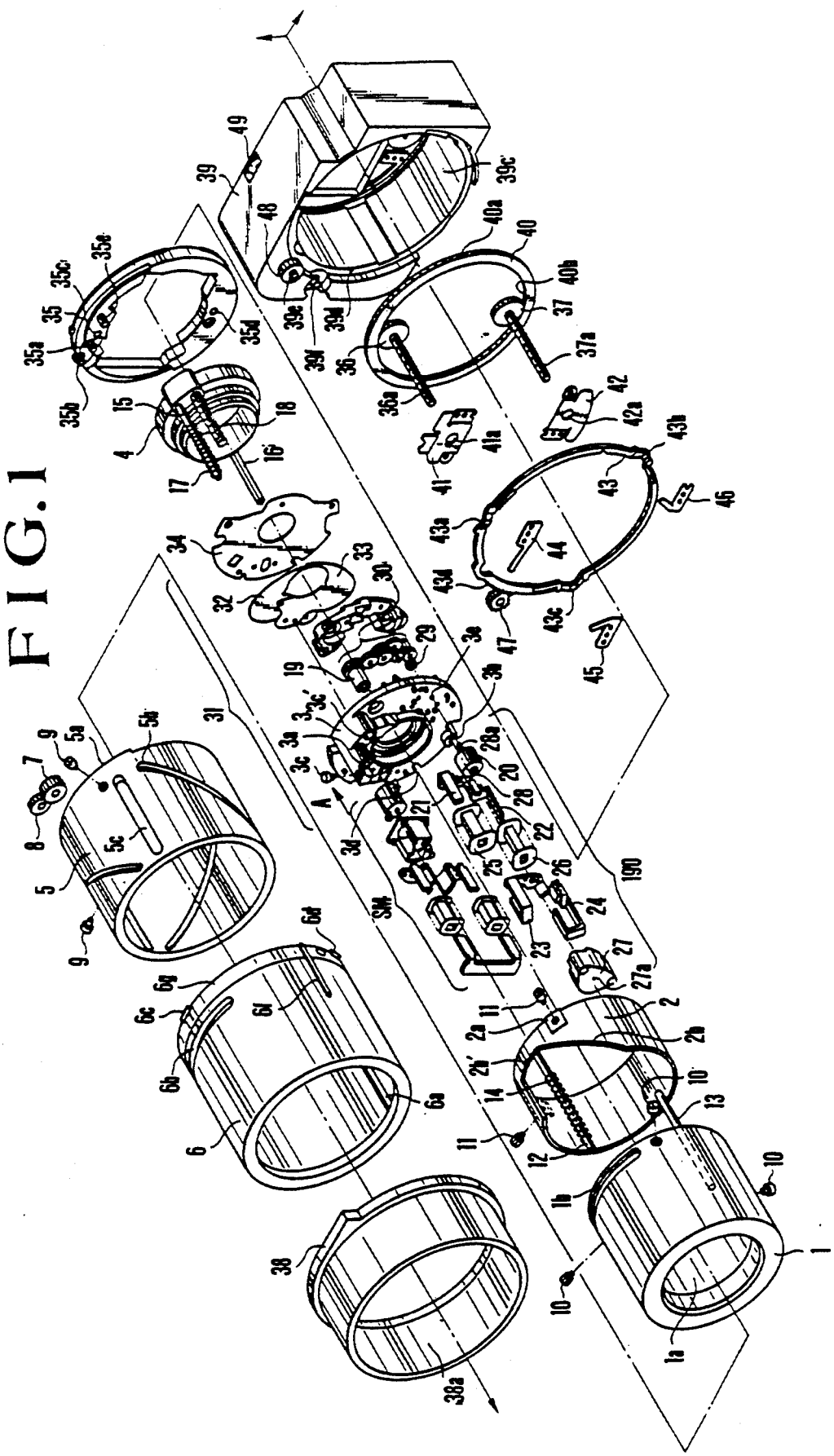
FIG. 1 is an exploded oblique view showing the lens barrel part of a camera having a lens barrel arranged according to this invention.

FIG. 1 shows the zoom lens barrel in an exploded oblique view. Referring to FIG. 1, a first-group lens barrel 1 carries at the fore end part 1a thereof a first lens group which is not shown. A second-group cam ring 2 is rotatably fitted into the first-group lens barrel 1 to engage the inner circumferential face of the latter. A shutter base plate 3 is arranged to carry a known shutter unit as well as a second lens group which is not shown. A third-group holder 4 is arranged to carry a third lens group. A first-group cam ring 5 is arranged to define the position of the first lens group and the first-group lens barrel 1 in the direction of a photo-taking optical axis. A straight movement guide 6 is fitted on the outer circumferential face of the first-group cam ring 5 to be rotatable relative to the latter and is provided with an axial slot 6a for allowing the first-group lens barrel 1 to straightly move only in the direction of the photo-taking optical axis.

An internal gear which is not shown is provided on the inner circumferential face of the rear end part 5a of the first-group cam ring 5. A gear 7 engages this internal gear and is arranged to engage also a gear 8 which is arranged to receive a driving force of a motor employed as a drive source as will be described later. The first-group cam ring 5 is rotatably carried by the inner circumferential face of the above-stated straight movement guide 6. However, a pin 9 which is provided on the outer circumferential face of the first-group cam ring 5 prevents the movement of the ring 5 in the direction of the optical axis as the pin 9 is inserted in a circumferential slot 6b provided in the straight movement guide 6.

Meanwhile, the first-group lens barrel 1 also has a pin 10 erected on its outer circumferential face. The pin 10 is inserted in the cam slot 5b of the cam ring 5 and the axial slot 6a of the straight movement guide 6 in such a way as to be slidable relative to these slots 5b and 6a. The position in the optical axis direction of the first-group lens barrel 1 is thus controlled by the cam slot 5b of the cam ring 5.

When the gear 8 begins to rotate by receiving the force of the motor, the gear 7 rotates. The rotating force is transmitted to the internal gear of the cam ring 5 to cause the cam ring 5 to begin to rotate. Since the pin 10 erected on the first-group lens barrel 1 is slidable relative to the cam slot 5b and the axial slot 6a within these slots, the rotation of the cam ring 5 causes the first-group lens barrel 1 to be driven in the optical axis direction to move as much as the axial displacement of the cam slot 5b allows. As a result, the first lens group is moved for zooming.

The zooming mechanism and the action of the second lens group are as follows: The second-group cam ring 2 is rotatably carried by the inner circumferential face of the first-group lens barrel 1. A pin 11 which is erected on the rear end part 2a of the cam ring 2 is inserted in the circumferential slot 1b of the first-group lens barrel 1 in such a way as to be slidable relative to the latter and is likewise inserted also in the axial slot 5c of the cam ring 5.

Therefore, when the cam ring 5 begins to rotate, the first-group lens barrel 1 moves along the optical axis. Then, the second-group cam ring 2 also moves in the direction of the optical axis together with the first-group lens barrel 1, because the axial movement of the second cam ring 2 is prevented jointly by the pin 11 and the circumferential slot 1b of the first-group lens barrel 1. Further, the pin 11 is inhibited from moving in the rotary direction relative to the cam ring 5 by the slot 5c of the cam ring 5. Therefore, when the cam ring 5 rotates, the second group cam ring 2 moves in the optical axis direction together with the first-group lens barrel 1 and, at the same time, rotates to the same degree of angle as the cam ring 5.

The first-group lens barrel 1 is provided with two guide bars 12 and 13 which are secured to the inside of the lens barrel 1 and extend in parallel with the optical axis. One guide bar 12 is slidably inserted in a hole 3a provided in the shutter base plate 3. A compression spring 14 which is fitted on the guide bar 12 urges the base plate 3 to move rearward (to the right as viewed on FIG. 1) in parallel with the optical axis. The other guide bar 13 is fitted into a cutout groove 3b formed in the peripheral edge of the shutter base plate 3. The shutter base plate 3 is thus prevented by the guide bar 13 from rotating around the optical axis. This allows the, base plate 3 to be movable only in parallel with the optical axis.

The shutter base plate 3 forms a known shutter unit 31 in conjunction with other parts such as the shutter blades 32 and 33, a blade retainer 34, etc.. On the shutter base plate 3 are mounted a stepping motor 190 which is arranged to drive a third lens group and a motor SM which is arranged to drive the shutter blades.

A pin 3c is secured to the shutter base plate 3 and is arranged to engage the cam face 2b of the abovestated second-group cam ring 2. Since the shutter base plate 3 is urged by the compression spring 14 to move rearward along the optical axis, the pin 3c is pressed against the cam face 2b of the second-group cam ring 2. Therefore, when the above-stated cam ring 5 is rotated, the second-group cam ring 2 is also rotated as mentioned above and the shutter base plate 3 which carries the second lens group is moved by the cam face 2b in the direction of the optical axis. By this, a zooming action is performed on the second lens group. Further, as mentioned above, the shutter base plate 3 is movable in the optical axis direction against the force of the compression spring 14. Therefore, a space between the first and second lens groups can be lessened by moving forward the shutter base plate 3 in parallel with the optical axis.

Next, a third lens group moving mechanism and the action thereof are described as follows:

The third-group holder 4 which carries the third lens group is provided with third-group guide bars 15 and 16 which are secured to the holder 4 in positions symmetrically across the optical axis and extend in parallel with the optical axis. One guide bar 15 has a compression spring 17 fitted thereon and is slidably fitted into a hole 3c' provided in the shutter base plate 3. The third-group holder 4 is urged to move rearward in the optical axis direction by the spring 17. The spring 17 thus serves to minimize the back-lash of a screwed engagement part between a helicoid shaft 18 which will be described later and a female helicoid tube and also the back-lash of a reduction gear train. The other guide bar 16 engages a cutout groove 3d provided in the base plate 3 and thus prevents the holder 4 from rotating around the optical axis. The holder 4 is provided further with the above-stated helicoid shaft 18 which extends in parallel to the guide bars 15 and 16 in a state of being screwengaged with the above-stated female helicoid tube which is unified in one body with a gear 19. The helicoid shaft 18 is thus arranged to move the third-group holder 4 in the optical axis direction when the gear 19 is caused to rotate.

Figure 2:
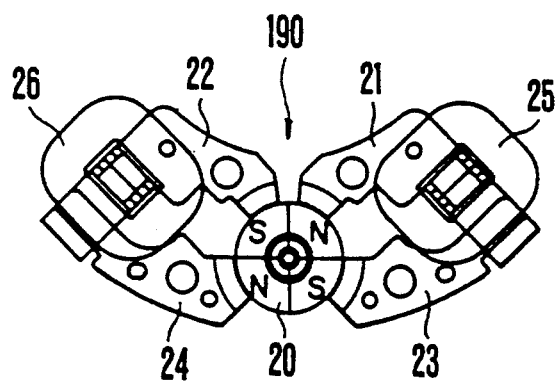
FIG. 2 is a front view showing a stepper motor disposed within the lens barrel of FIG. 1.

A known stepping motor 190 is provided with a permanent magnet rotor 20 which is polarized to have four poles in the circumferential direction thereof. FIG. 2 shows this motor in a front view. Referring to FIG. 2, yokes 21 and 23 form a magnetic path in conjunction with a bobbin 25. Yokes 22 and 24 form another magnetic path in conjunction with another bobbin 26.

A magnet cover 27 is provided with a fitting hole 27a for rotatably positioning the upper end part of a center shaft 28 which is secured to the permanent magnet rotor 20. The other end 28a of the center shaft 28 is rotatably carried by a thorough hole 3e which is provided in the shutter base plate 3. The center shaft 28 is thus held between the magnet cover 27 and the base plate 3. Further the shaft end 28a protrudes from the rear side of the shutter base plate 3. A pinion 29 is secured to the tip end of the center shaft and arranged to transmit the output of the stepper motor 190.

With the stepper motor 190 arranged in this manner, the yokes 21 to 24 are excited by applying the power to coils wound around the above-stated bobbins 25 and 26. The permanent magnet rotor 20 is caused to rotate by suitably changing the phase of the power applied. The output of the motor thus obtained is transmitted to the pinion 29. When the pinion 29 begins to rotate, the gears of the reduction gear train 30 rotate one after another. This causes the gear 19 which is unified in one body with the female helicoid tube to begin to rotate. The helicoid shaft 18 is thus driven in the optical axis direction to move the third-group holder 4 also in the optical axis direction. A zooming action is thus performed on the third lens group.

In the case of this embodiment, the optical system is arranged to form the photo-taking lens of the rear focus type wherein focus adjustment, i.e., an automatic focusing (hereinafter referred to as AF) action is performed by means of the third lens group. Therefore, the third lens group is arranged to be used for focusing-lens position control besides the above-stated zooming action. The third lens group is driven for this purpose on the same principle as in the above-stated case. Therefore, the AF driving action is not described.

A gear carrying plate 35 is secured to the rear end of the straight movement guide 6. The plate 35 is provided with a fixed shaft 35a which is arranged to rotatably carry a gear 7; a rotating shaft 35b which is arranged to rotatably carry a gear 8; a screw hole or a female helicoid hole 35c which is screw-engaged with a helicoid shaft 36a; and another female helicoid hole 35d which is screw-engaged with a helicoid shaft 37a. These holes 35c and 35d are formed in parallel with the optical axis. Further, the female helicoid holes 35c and 35d are located on the periphery of a circle of a diameter smaller than the outside diameter of the lens barrel 1 and are in positions not to interfere with other members. A stopper pin 35e is arranged to have the shutter base plate 3 collide therewith.

Figure 3:
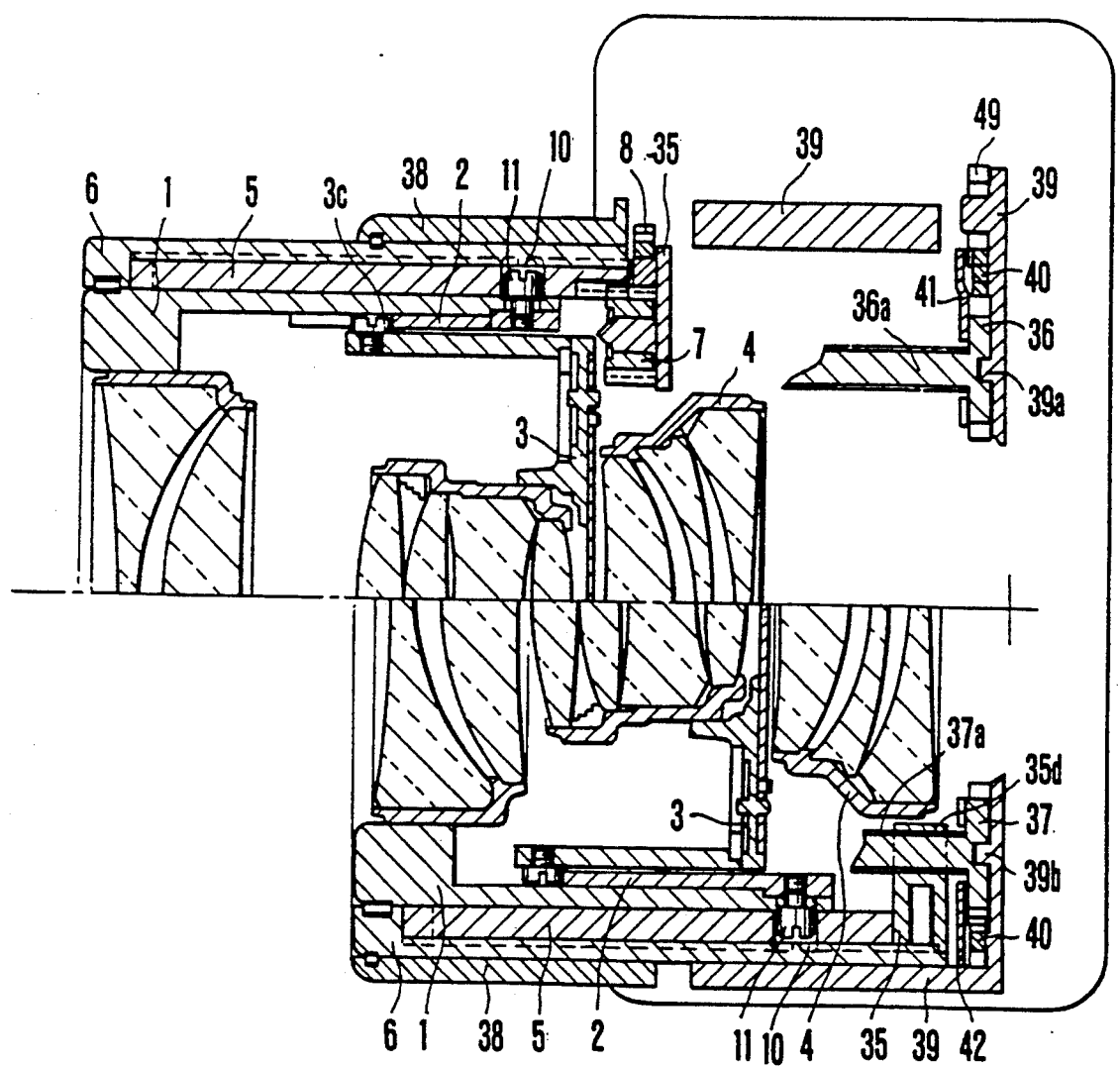
FIGS. 3, 4 and 5 are sectional views showing the lens barrel part of FIG. 1 in different states.

A stationary lens barrel 38 is secured to the camera body 39. The straight movement guide 6 is inserted into the stationary lens barrel 38 in such a way as to be movable forward and rearward in parallel with the optical axis. As shown in FIG. 3, the first-group cam ring 5, the first-group lens barrel 1 and the second-group cam ring 2 are fitted into the straight movement guide 6 one after another in this order from the inner side to the outer side within the guide 6. The shutter unit 31 including the shutter base plate 3 is disposed on the inner side of the second-group cam ring 2. The third-group holder 4 is disposed further to the rear than the shutter unit 31. The gear carrying plate 35 is attached to the rear end of the straight movement guide 6.

The straight movement guide 6, the first-group cam ring 5, the first-group lens barrel 1, the second-group cam ring 2, the shutter unit 31, the third-group holder 4 and the gear carrying plate 35 are movable in the optical axis direction within the stationary lens barrel 38. In the present specification, a unit composed of these seven main members is called a photo-taking lens barrel unit.

A strip 6F, which axially extends, protrudes from the outer circumferential face of the straight movement guide 6. The protruding strip 6f is slidably fitted into an axial groove which is not shown but is provided in the inner circumferential face of the stationary lens barrel 38. This arrangement enables the straight movement guide 6 to axially move within the stationary lens barrel 38 without rotating.

A larger diameter part 6g is formed at the rear end of the straight movement guide 6. Protrusions 6c, 6d and 6e (see FIG. 6) are provided on the peripheral face of the larger diameter part 6g for the purpose of determining the position of the photo-taking lens barrel unit in the optical axis direction by the rotation of a bayonet ring 43. The protrusions 6c, 6d and 6e are each arranged to engage the bayonet ring 43, respectively.

Within the camera body 39, there are provided a mechanism for transmitting a force required in moving back and forth the gear carrying plate 35 and the straight movement guide 6 in parallel with the optical axis; a mechanism for transmitting a force required in rotating the bayonet ring 43; and a mechanism for transmitting a driving force required in rotating the gear 8. These transmission mechanisms include, for example, a ring gear 40 shown in FIG. 1; two gears 36 and 37 which engage the internal gear 40b of the ring gear 40; helicoid shafts 36a and 37a each of which is formed in one body with the gear 36 or 37; and the bayonet ring 43 which has a ,gear part 43d formed at a part of the peripheral face thereof.

As shown in FIG. 1, the camera body 39 is provided with a hole 39c which is arranged to be capable of stowing the above-stated photo-taking lens barrel unit therein. On the innermost end side of the hole 39c, the following parts are arranged as shown in FIG. 3: A gear support shaft 39a protrudes to fittingly engage a recessed part formed in the end face of the gear 36. Another gear support shaft 39b also protrudes to fittingly engage a recessed part formed in the end face of the gear 37. The gears 36 and 37 are thus supported to be rotatable in fixed positions respectively by the shafts 39a and 39b.

The gears 36 and 37 are formed together with the helicoid shafts 36a and 37a, respectively. The helicoid shaft 36a is screw-engaged with a female helicoid hole (or screw hole) 35c provided in the gear carrying plate 35. The other helicoid shaft 37a is screw-engaged with a female helicoid hole (or screw hole) 35d formed in the gear carrying plate 35. The ring gear 40 which engages the gears 36 and 37 is provided with an external gear 40a which is formed on its peripheral face and an internal gear 40b which is formed on its inner circumferential face. The gears 36 and 37 are engaging the internal gear 40b of the ring gear 40.

As shown in FIG. 3, the ring gear 40 is rotatably disposed in the innermost part of the photo-taking-lens-barrel-unit stowing hole 39c of the camera body 39. The ring gear 40 has the gears 36 and 37 engaging its internal gear 40b and also has a gear 49 engaging its external gear 40a. The gear 49 is arranged to protrude to the outside through a window provided in the upper part of the camera body 39. The gear 49 engages a gear which is not shown but is arranged to be rotated by a motor which is employed as a drive source as will be described later.

To prevent the ring gear 40 and the gears 36 and 37 from moving in the axial direction, a gear retaining plate 41 which has a hole 41a loosely fitted on the helicoid shaft 36a and a gear retaining plate 42 which has a hole 42a likewise loosely fitted on the helicoid shaft 37a are fitted, respectively, on the helicoid shafts 36a and 37a These retaining plates 41 and 42 are arranged to face the end faces of the gears 36 and 37 and the ring gear 40, respectively and are secured to the camera body 39 by means of screws or the like.

A facing part 39d is formed along the opening edge of the above-stated hole 39c of the camera body 39. The above-stated bayonet ring 43 is rotatably disposed on the facing part 39d. A gear part 43d is formed at a part of the peripheral face of the bayonet ring 43. A gear 47 which is carried by a protrusion 39f of the camera body 39 is arranged to engage the gear part 43d for the purpose of turning the bayonet ring 43. The bayonet ring 43 is provided with three stepped parts 43a, 43b and 43c which protrude outward and forward, respectively. Bayonet ring retaining plates 44, 45 and 46 are provided with springy contacts for preventing the bayonet ring 43 from moving in the axial direction and are arranged to engage these stepped parts. These retaining plates 44, 45 and 46 are secured to the end face of the camera body 39 by means of screws or the like. These bayonet ring retaining plates 44, 45 and 46 are disposed in positions corresponding to the three protrusions 6c, 6d and 6e of the straight movement guide 6. A gear 48 is carried by a protrusion 39e of the camera body 39 and is arranged to transmit the driving force of the motor by engaging the gear 8 when the photo-taking lens barrel unit is drawn out from its retracted position.

Figure 10:
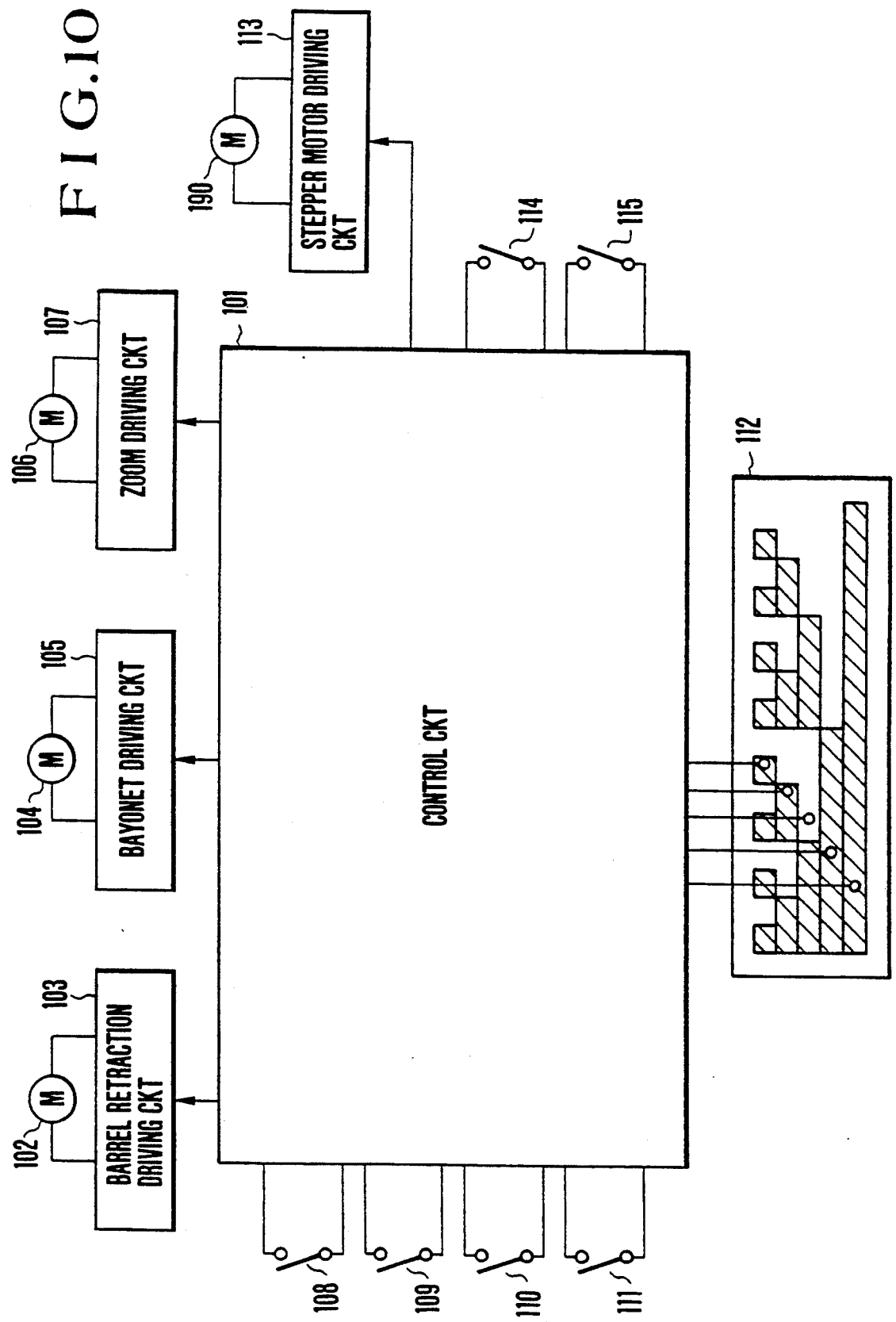
FIG. 10 is a circuit diagram showing by way of example a circuit arrangement for driving the mechanism of FIG. 1.

FIG. 10 is a circuit diagram showing by way of example a driving circuit for the mechanism shown in FIG. 1. Referring to FIG. 10, a control circuit 101 which is composed of a microcomputer, etc is arranged to control the whole sequence of driving processes. A lens barrel retracting motor 102 is arranged to drive the gear 49. A barrel retraction driving circuit 103 is arranged to drive the retracting motor 102. A bayonet bayonet 104 which is provided for the bayonet is arranged to drive a gear 47. A bayonet driving circuit 105 is arranged to drive the bayonet motor 104. A zoom motor 106 which is provided for zooming is arranged to drive the gear 48. A zoom driving circuit 107 is arranged to drive the zoom motor 106. A barrel retraction completion determining switch 108 is arranged to determine completion of the lens barrel retraction according to the drawn-in position of the straight movement guide 6. A drawing-out completion determining switch 109 is arranged to determine completion of the process of drawing the straight movement guide 6 out from the barrel retracted position thereof according to the drawn-out position of the straight movement guide 6. A holding completion determining switch 110 is arranged to determine completion of the holding action of the bayonet ring 43 on the straight movement guide 6 according to the position of the bayonet ring 43. A release completion determining switch 111 is arranged to determine completion of a release of the straight movement guide 6 from the holding action of the bayonet ring 43 according to the position of the bayonet ring 43. A zoom position detection switch 112 is arranged to determine the zoom state of the first and second lens groups according to the position of the first-group cam ring 5. A driving circuit 113 is provided for the stepper motor 190 which is arranged to drive the third lens group. A retraction start switch 114 is provided for commencement of the lens barrel retracting process. A drawing-out start switch 115 is provided for commencement of the process of drawing out the photo-taking lens barrel unit from its retracted position.

Figure 11:
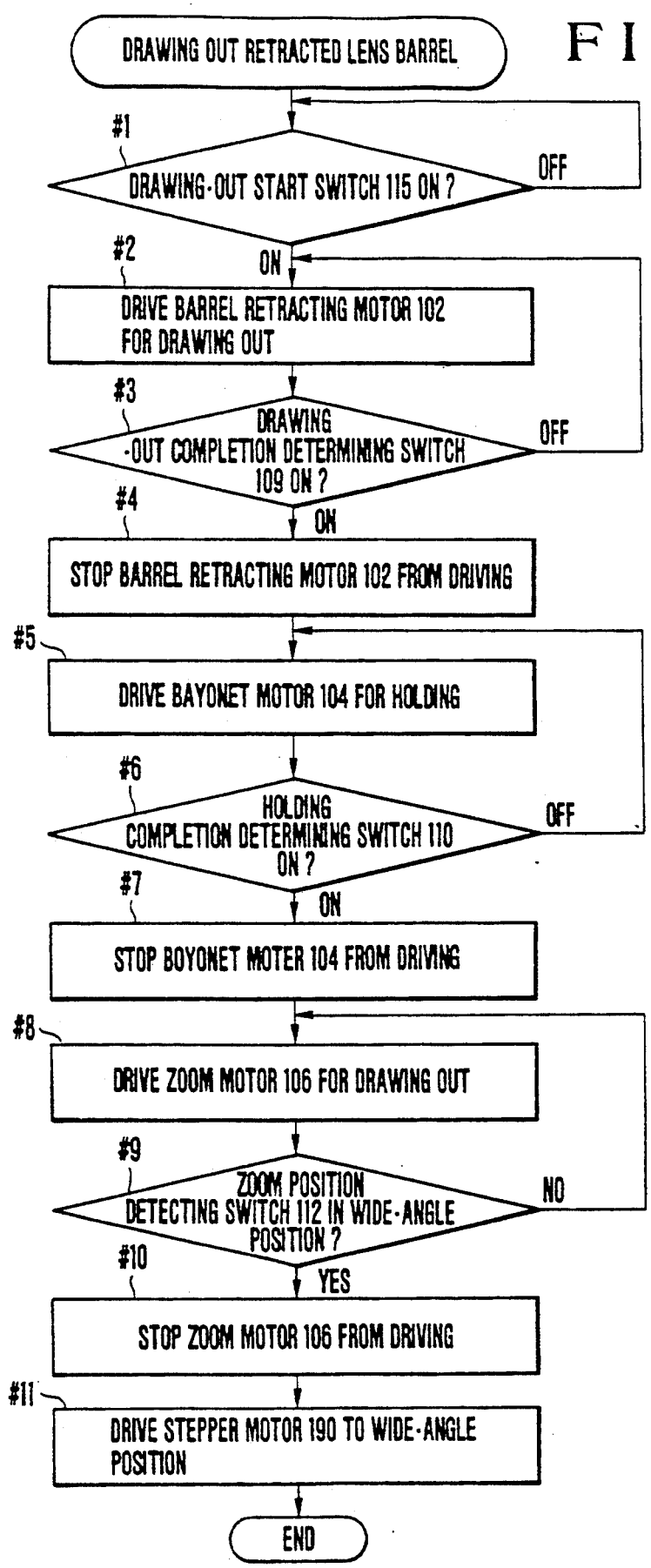
FIGS. 11 and 12 are flowcharts showing the operation of a control circuit shown in FIG. 10.
Figure 12:
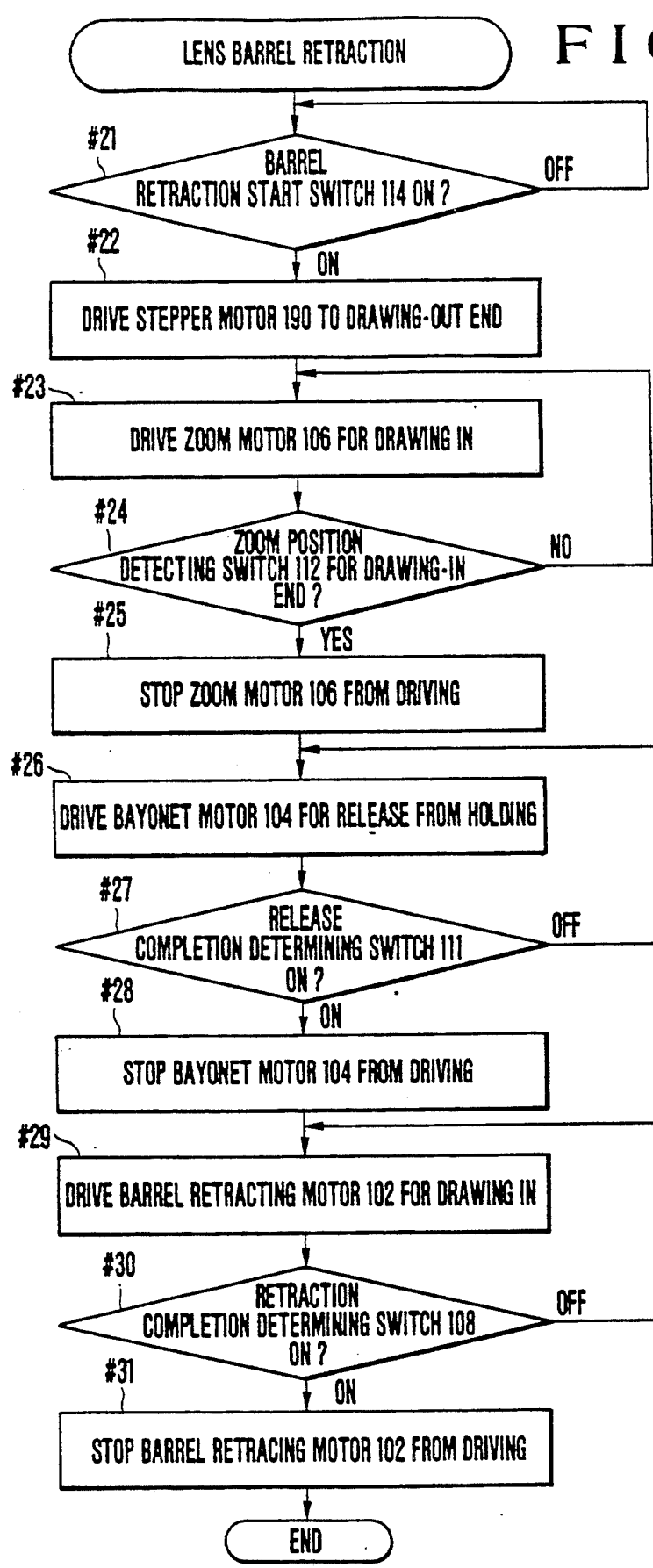

FIG. 11 is a flow chart showing the operation of the control circuit 101 of FIG. 10 to be performed in drawing the lens barrel unit out from its retracted position. FIG. 12 is a flow chart showing the operation of the control circuit 101 to be performed in drawing the lens barrel unit into the retracted position.

Next, referring to FIG. 1 to FIG. 11, the action to be performed by each of the parts included in the arrangement described above in drawing out the photo-taking lens barrel unit from the retracted position thereof (shown in the lower half of FIG. 3) is described below:

With the photo-taking lens barrel unit in the retracted position, the straight movement guide 6 is in a state of being retracted to a position where a protrusion which is not shown but is erected in the rear of the gear carrying plate 35 is abutting on the innermost end face of the hole 39c of the camera body 39. Meanwhile, the first-group lens barrel 1 is in a position of being drawn in to the utmost end relative to the straight movement guide 6. In other words, the lens barrel 1 is in a position obtained by rotating the first-group cam ring 5 clockwise as viewed on FIG. 1 to the utmost degree. As a result of the clockwise rotation of the cam ring 5, the second-group cam ring 2 is in a position also obtained by rotating clockwise to the utmost end, at which the deepest cut cam face part 2b' of the cam face 2b of the second-group cam ring 2 is facing the pin 3c of the shutter base plate 3. Further, the third-group holder 4 has been driven by the stepper motor 190 to a position where the holder 4 is located at a minimum distance from the shutter base plate 3. Meanwhile, a protrusion which is not shown but is erected in the rear of the third-group holder 4 abuts on the front side of the gear retaining plate 41 to push the shutter base plate 3 against the force of the compression spring 14 to a point located farther forward than a point where the pin 3c of the shutter base plate 3 abuts the cam face part 2b' of the second group cam ring 2.

When the drawing-out start switch 115 is turned on under the above-stated retracted condition, the control circuit 101 sends a signal to the barrel retraction driving circuit 103. This causes the lens barrel retracting motor 102 to begin a driving action in the direction of drawing out the lens barrel. The motor 102 then rotates the gear 49. This causes the ring gear 40 to rotate. The gears 36 and 37 which engage the gear 40 are then rotated in the same direction to the same degree of rotation angle. The helicoid shafts 36a and 37a which are in one united body with the gears 36 and 37 respectively are rotated. The gear carrying plate 35 which is screw-engaged with the shafts 36a and 37a is moved forward in parallel with the optical axis. Therefore, the straight movement guide 6 which is in one united body with the gear carrying plate 35 is caused to move forward within the stationary lens barrel 38. The first-group cam ring 5, the first-group lens barrel 1 and the second-group cam ring 2 which are disposed inside of the the straight movement guide 6 move forward together with the straight movement guide 6. The protruding strip is provided on the outer circumferential face of the straight movement guide 6 remains in a state of being fitted in the axial groove of the inner circumferential face of the stationary lens barrel 38 while the guide 6 is moving forward. This prevents the straight movement guide 6 from rotating. During the process of forward movement, the spring 14 which is provided on the guide bar 12 within the second-group cam ring 2 exerts a pushing force to keep the third-group holder 4 in a state of abutting on the front surface of the gear retaining plate 41. As a result, an interval space between the shutter base plate 3 and the first-group lens barrel 1 increases. Then, a space between the first lens group and the second lens group also gradually increases. When the protruding pin 35e of the gear carrying plate 35 comes to abut on the rear surface of the shutter base plate 3, the third-group holder 4 moves away from the gear retaining plate 41. After that, the space between the first and second lens groups remains unchanged while the photo-taking lens barrel unit is drawn out from the stationary lens barrel 38.

Figure 6:
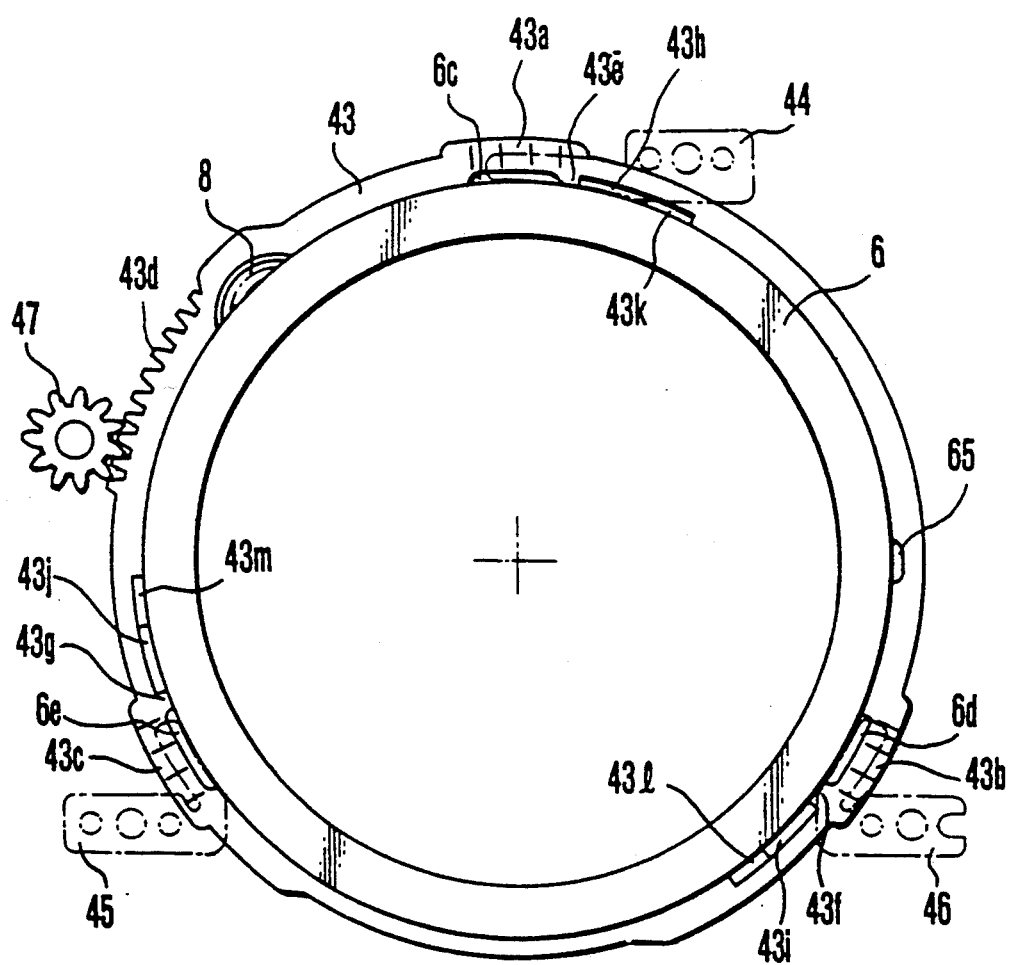
FIGS. 6 and 7 show the retracting and drawing-out actions on the lens barrel of FIG. 1.

When the lens barrel unit drawing-out process comes close to an end, the lens barrel unit reaches the position of having passed through the bayonet ring 43. The rear-end larger diameter part 6g of the straight movement guide 6 then comes to be fitted into the hole 38a of the stationary lens barrel 38. The guide 6 is thus supported within the stationary lens barrel 38 by the larger diameter part 6g in a state as shown in FIG. 6.

Immediately before this state is obtained, the drawing-out completion determining switch 109 turns on. In response to this, the control circuit 101 sends a signal to the barrel retraction driving circuit 103 to bring the driving action of the barrel retracting motor 102 to a stop. As a result, the gear 49 stops rotating and the lens-barrel-unit drawing-out action comes to a stop.

At this time, in the lens barrel unit, the rear end part of the straight movement guide 6 has come to the position of having passed through the bayonet ring 43.

When the lens barrel unit comes to the retracted position, the bayonet ring 43 has been rotated to a position where the stepped parts 43a, 43b and 43c confront the three protrusions 6c, 6d and 6e of the straight movement guide 6. Therefore, when the rear end part of the straight movement guide 6 passes through the bayonet ring 43, the three protrusions 6c, 6d and 6e are allowed to pass through the outward spreading parts of the stepped parts 43a, 43b and 43c of the bayonet ring 43 respectively. At this moment, the bayonet ring retaining plates 44, 45 and 46 would exert forces to pull the three protrusions 6c, 6d and 6e of the straight movement guide 6 backward in the optical axis direction. However, these bayonet ring retaining plates 44, 45 and 46 are locked by the forward protruding parts of the stepped parts 43a, 43b and 43c of the bayonet ring 43. This allows the lens barrel unit to come to a stop in a position where the rear end part of the straight movement guide 6 has cleared the bayonet ring 43, that is, where the rear end of the lens barrel unit is located at a point farther forward than the front end face of the bayonet ring 43.

Under this condition, the control circuit 101 sends a signal to the bayonet driving circuit 105. This causes the bayonet motor 104 to drive the gear 47 in such a way as to rotate the bayonet ring 43 counterclockwise.

When the bayonet ring 43 rotates, the bayonet ring retaining plates 44, 45 and 46 are released from the state of having their spring force locked by the stepped parts 43a, 43b and 43c as these parts 43a, 43b and 43c also rotate. This allows the bayonet retaining plates 44, 45 and 46 to begin to exert their forces of pushing the protrusions 6c, 6d and 6e of the straight movement guide 6 rearward in the optical axis direction. However, at that time, the bayonet ring 43 has already rotated to a certain degree of angle. Therefore, the protrusions 6c, 6d and 6e of the straight movement guide 6 are pushed against the parts 43e, 43f and 43g of the bayonet ring 43 by the pushing forces.

When the bayonet ring 43 continues to further rotate, the raised cam parts 43h, 43i and 43j of the bayonet ring 43 push against the protrusions 6c, 6d and 6e. These cam parts thus push the straight movement guide 6 further forward by overcoming the above-stated pushing forces of the bayonet ring retaining plates.

After that, when the protrusions 6c, 6d and 6e come to ride on the flat parts 43k, 43l and 43m of the bayonet ring 43 which are located on the extensions of the above stated cam parts 43h, 43i and 43j, the holding completion determining switch 110 turns on. In response to this, the control circuit 101 sends a signal to the bayonet driving circuit 105 to bring the driving action of the bayonet motor 104 to a stop.

Figure 7:
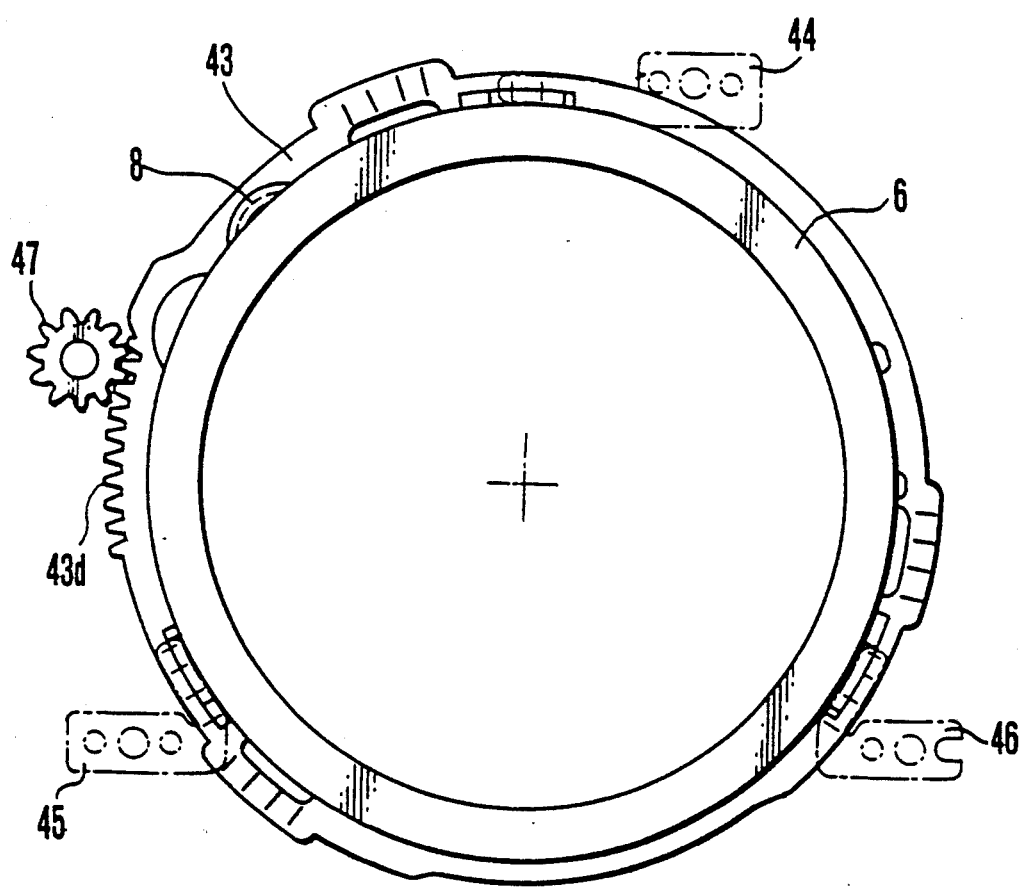

FIG. 7 is a front view showing the essential parts of the embodiment in a state of having completed the actions described above. In the condition shown in FIG. 7, the straight movement guide 6 has been firmly locked in a shooting standby position after completion of the process of drawing it out from the lens barrel retracted position. The upper half of FIG. 3 shows a state then obtained within the lens barrel unit.

Figure 8:
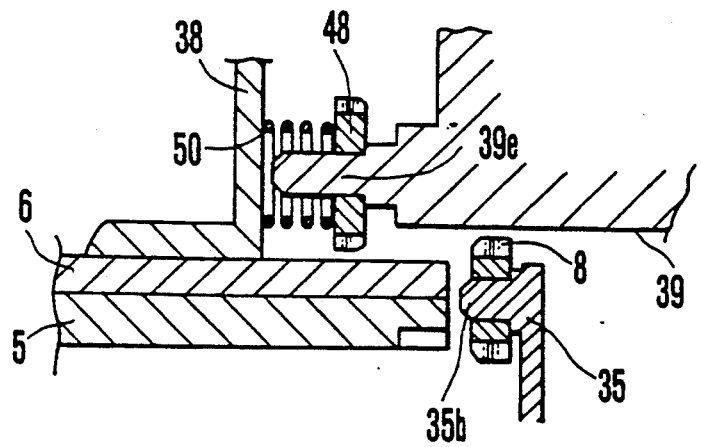
FIGS. 8 and 9 show the power transmitting mechanism arranged within the lens barrel of FIG. 1.
Figure 9:
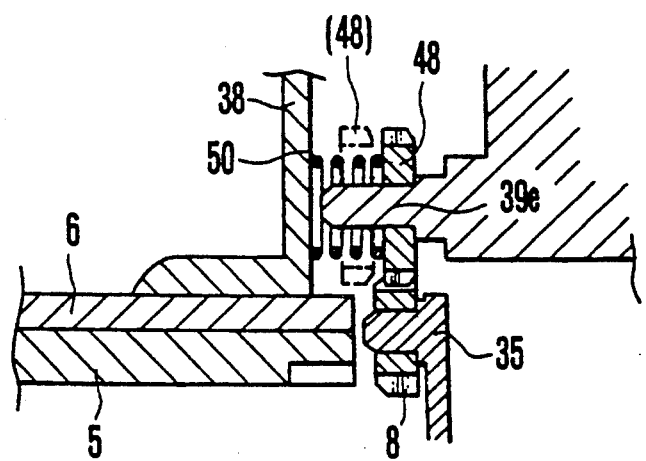

FIGS. 8 and 9 are sectional views showing the gear 8 which is arranged to drive the cam ring 5 to rotate and the gear 48 which is arranged to be rotated by the driving force of the zoom motor 106 in a state of being connected to each other by the above-stated action of drawing the lens barrel unit out from its retracted position. FIG. 8 shows the lens barrel unit in process of being drawn out from the retracted position. In this state, the gears 8 and 48 are not yet connected. When lens barrel unit is further drawn out, these gears come to be connected as shown in FIG. 9. Then, with the lens barrel unit being drawn out in a state of having the teeth of the gear 8 not interfering with those of the gear 48, that is, in an adequately meshing state, the gear 8 is connected to the gear 48 which has been kept by the urging force of a coiled spring 50 in a position as indicated with a full line.

However, in a case where the drawn-out movement of the lens barrel unit causes the teeth of the gear 8 and those of the gear 48 to interfere with each other (if the teeth of the gears 8 and 48 collide with each other), the gear 48 is retracted against the urging force of the coiled spring 50 to a position indicated by a dotted line in FIG. 9 in the state of being rotatably carried by the shaft 39e erected on the camera body 39. The driving force of the zoom motor 106 is arranged to be transmissible even while the gear 48 is in the retracted position, for example, by increasing the tooth thickness of the gear 48 in such a way as to enable it to engage the gear on the driving side even in the retracted position. With the driving force from the drive source thus received by the gear 48, the gear 48 is caused by the force of the spring 50 to slide to the full line position as shown in FIG. 9 to be connected to the gear 8 when the gear 48 is rotated by the driving force.

The first, second and third lens groups have not yet been set in a photo-taking position when the lens barrel unit is just drawn out completely from its retracted position. After that, the control circuit 101 sends a signal to the zoom driving circuit 107 for driving the zoom motor 106. The motor 106 then causes, through the gears 8 and 7, the first-group cam ring 5 to rotate counterclockwise as viewed in FIG. 5.

The first-group lens barrel 1 is then drawn out forward along the cam slot 5b of the first-group cam ring 5. Meanwhile, the shutter base plate 3 is kept by the force of the compression spring 14 in a state of abutting on the pin 35e protruding from the gear carrying plate 35. Since the pin 3c is located farther forward than the position of abutting on the cam face part 2b' of the second-group cam ring 2, a space between the first-group lens barrel 1 and the shutter base plate 3 increases and a space between the first and second lens groups also increases.

When the first-group cam ring 5 rotates further counterclockwise, the pin 3c protruding from the shutter base plate 3 comes to abut on the cam face 2b of the second-group cam ring 2. This enables the shutter base plate to move along the cam face 2b for zooming.

When the first and second lens groups are drawn out to a wide-angle shooting position by the counterclockwise rotation of the first-group cam ring 5, this state is detected by the zoom position detecting switch 112. In response to this, the control circuit 101 sends a signal to the zoom driving circuit 107 to bring the driving action of the zoom motor 106 to a stop.

Figure 4:
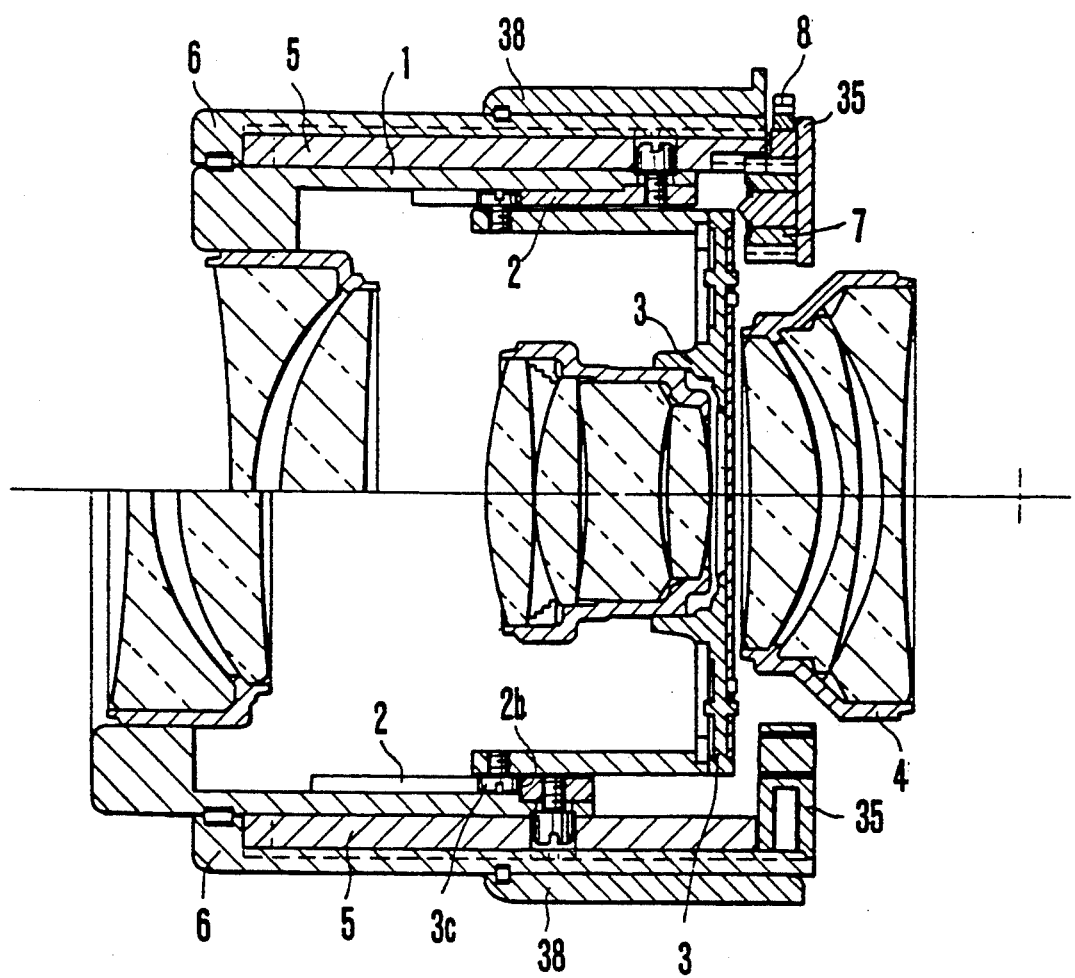

The state of the essential parts of the photo-taking lens barrel unit obtained under this condition is shown in the lower half part (below the optical axis) of FIG. 4 which is a sectional view. In FIG. 4, the upper half part, above the optical axis, shows the lens barrel unit as in a state obtained after completion of drawing it out from its retracted position. This is identical with the state shown in the upper half part (above the optical axis) of FIG. 3.

After the cam ring 5 is rotated under the above-stated condition, the control circuit 101 sends a signal to the stepper motor driving circuit 113. This causes the stepper motor 190 to move the third-group holder 4 to a position behind the shutter base plate 3. Then, the third lens group is driven to come to a wide-angle shooting position.

Figure 5:
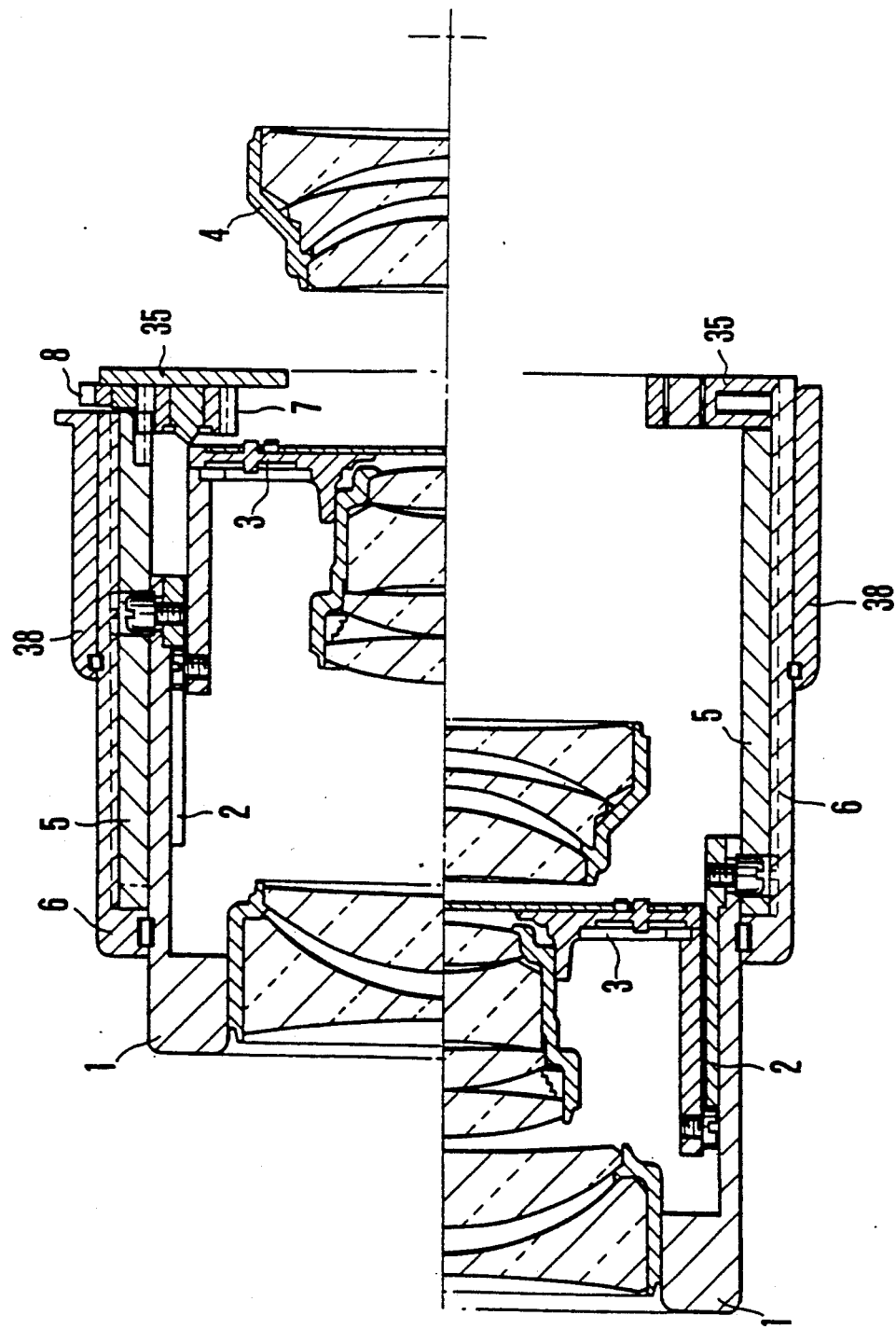

All the first, second and third lens groups are thus completely readied for wide-angle shooting through the processes described above. The state of the essential parts of the photo-taking lens barrel unit thus obtained is shown in the upper half part (above the optical axis) of FIG. 5 which is a sectional view. The lower half (below the optical axis) of FIG. 5 shows a state obtained when the photo-taking lens system is set in a telephoto shooting position by zooming. The details of the zooming action have already been described in the foregoing and, therefore, require no further description.

An operation to be performed in retracting the lens barrel unit from the drawn-out position is described below with reference to FIGS. 1 to 10 and 12:

This operation is the reverse of the operation performed as described above in drawing the lens barrel unit out from its retracted position. Therefore, the operation briefly described as follows. When the barrel retraction start switch 114 is turned on, the control circuit 101 sends a signal to the stepper motor driving circuit 113 to drive the stepper motor 190. In response to this, the stepper motor 190 drives the third-group holder 4 to come to a position closest to the shutter base plate 3. Next, the control circuit 101 sends a signal to the zoom driving circuit 107. This causes the first-group cam ring 5 to rotate clockwise as viewed on FIG. 1. The first-group lens barrel 1 is moved by this to the most drawn-in position relative to the straight movement guide 6. At the same time, the second-group cam ring 2 is caused to rotate clockwise to cause the shutter base plate 3 to come, against the urging force of the spring 14, to abut on the stopper pin 35e of the gear carrying plate 35. As a result, the pin 3c of the shutter base plate 3 comes to be located farther forward than the cam face part 2b' of the second-group cam ring 2.

When this state of the lens barrel unit is detected by the zoom position detecting switch 112, the control circuit 101 sends a signal to the zoom driving circuit 107 to bring the zoom motor 106 to a stop.

After this, the control circuit 101 sends a signal to the bayonet driving circuit 105. The signal causes the bayonet motor 104 to drive the bayonet ring 43 to rotate counterclockwise. When the bayonet ring 43 rotates to a position where the stepped parts 43a, 43b and 43c of the ring 43 come to confront the three protrusions 6c, 6d and 6e of the straight movement guide 6, the release completion determining switch 111 turns on. In response to this, the control circuit 101 sends a signal to the bayonet driving circuit 105. The signal stops the bayonet motor 104 from driving.

Then, the protrusions 6c, 6d and 6e of the straight movement guide 6 are released from a state of being held jointly by the bayonet ring 43 and the bayonet retaining plates 44, 45 and 46. This allows the protrusions 6c, 6d and 6e to pass through the outward spreading parts of the stepped parts 43a, 43b and 43c of the bayonet ring 43 and thus brings the straight movement guide 6 into a state of permitting the lens barrel unit to be drawn in and retracted rearward in the optical axis direction.

Next, the control circuit 101 sends a signal to the barrel retraction driving circuit 103. The signal causes the barrel retracting motor 102 to begin its driving action for drawing the lens barrel unit inward. This causes the ring gear 40 to rotate. The helicoid shafts 36a and 37a rotate to move the straight movement guide 6 rearward in the optical axis direction. The lens barrel unit is then drawn in as a whole.

When the third-group holder 4 comes to abut on the gear retaining plate 41, the third-group holder 4 and the shutter base plate 3 come to a stop there. However, the straight movement guide 6, the first-group cam ring 5, the first-group lens barrel 1 and the second-group cam ring 2 further move rearward. When a protrusion (not shown) of the gear carrying plate 35 comes to abut on the innermost end face of the hole 39c of the camera body 39, the barrel retraction completion determining switch 108 turns on. In response to this, the control circuit 101 sends a signal to the barrel retraction driving circuit 103. The signal causes the barrel retracting motor 104 to stop driving. The lens barrel unit retracting operation then comes to an end.

In the embodiment described, when the photo-taking lens barrel unit is drawn out by means of the driving member, the engagement of the unit with the camera body is retained by the bayonet ring 43 and the bayonet ring retaining plates 44, 45 and 46. However, this arrangement is of course replaceable with some other arrangements.

Figure 13:
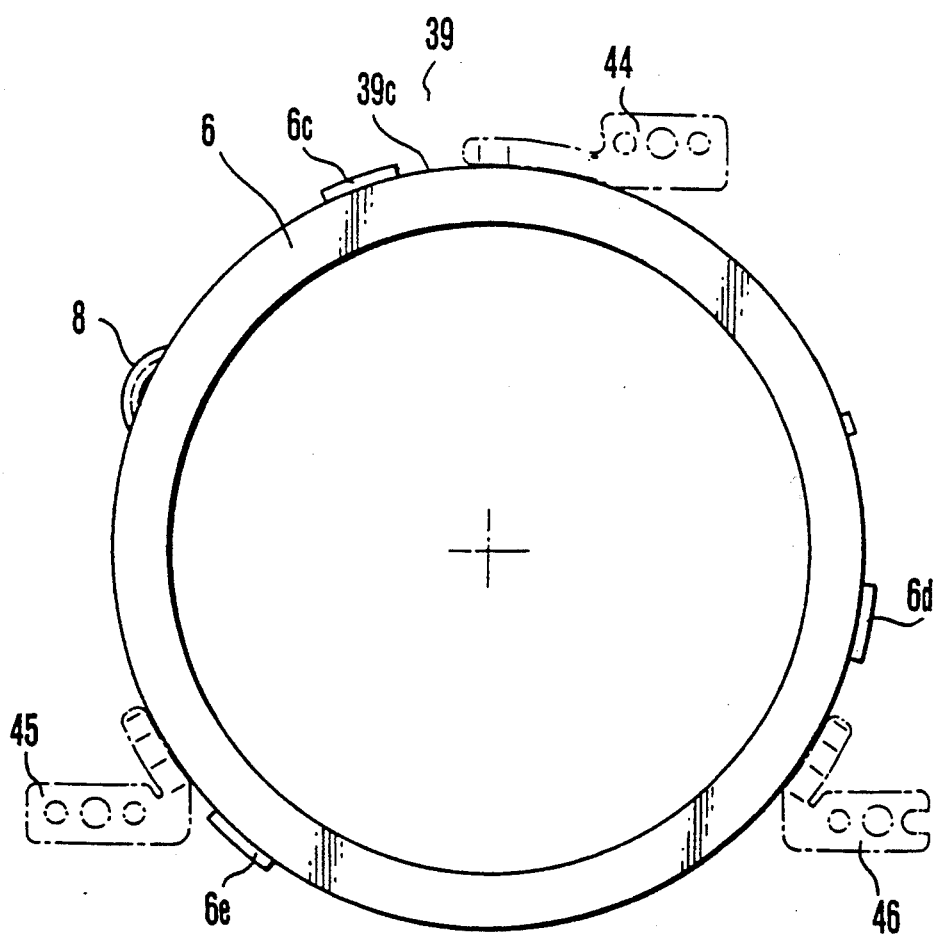
FIGS. 13 to 17 show another embodiment of this invention.
Figure 14:
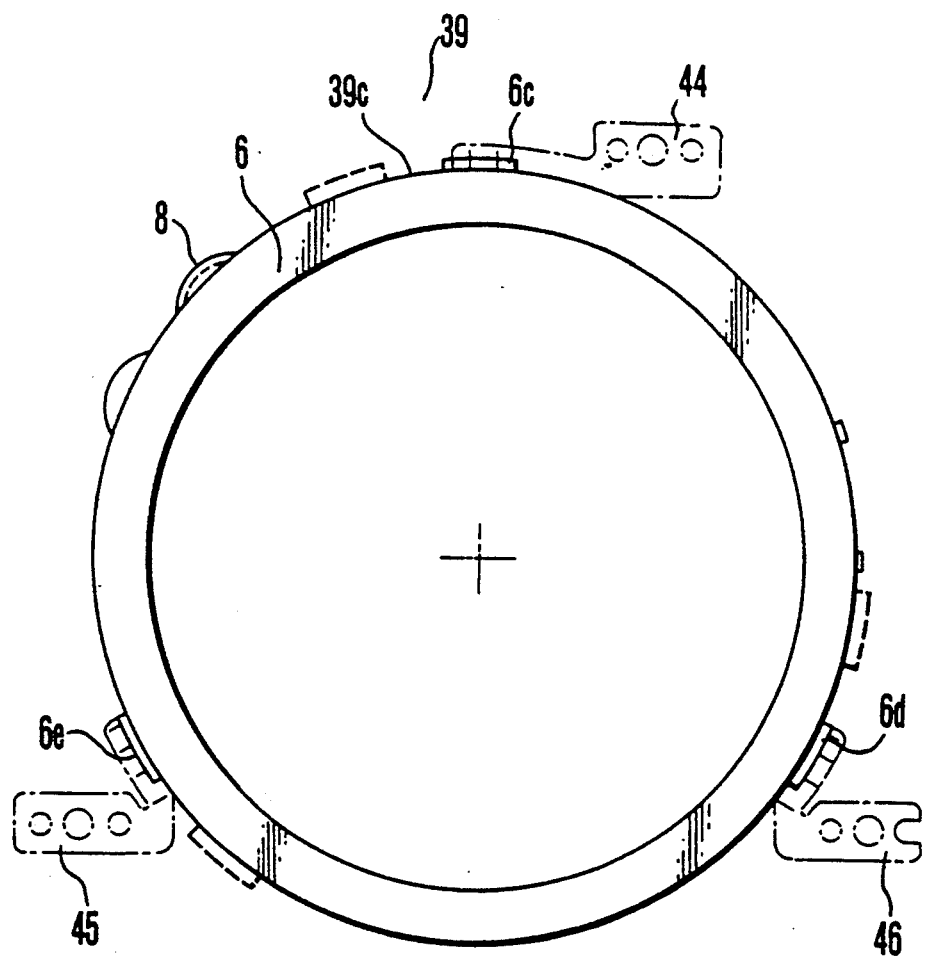
Figure 15:
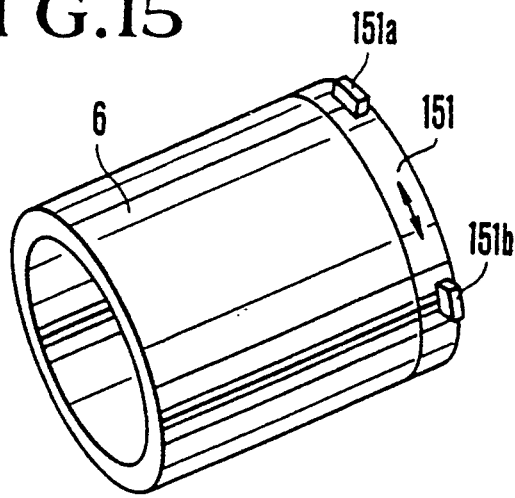

FIG. 13 shows an example of such arrangement. In this case, the straight movement guide 6 which has its exterior guided to the hole 39c of the camera body 39 is arranged to be rotated clockwise, as viewed on FIG. 13, 45° from the above-stated drawn-out position by known driving means in such a way as to have the protrusions 6c, 6d and 6e held between the camera body 39 and the above-stated retaining plates 44, 45 and 46 respectively as shown in FIG. 14. The purpose of this invention is also attainable by this arrangement. In this instance, the gear carrying plate 35 cannot be rotated because of the helicoid coupling with the helicoid shafts 36a and 37a. However, the gear carrying plate 35 is arranged to be rotatable relative to the straight movement guide 6. Further, the arrangement may be changed as shown in FIG. 15. Referring to FIG. 15, in that case, the protrusions 6c, 6d and 6e of the straight movement guide 6 are replaced with a ring member 151 which is provided with protrusions 151a, 151b and 151c (not shown). The member 51 is arranged to rotatably carry the straight movement guide 6. After completion of the process of drawing out the lens barrel unit from its retracted position, the ring member 151 is rotated to allow the protrusions 151a, 151b and 151c to be engaged and held between the camera body 39 and the bayonet ring retaining plates 44, 45 and 46 in the same manner as other embodiments described above.

Figure 16:
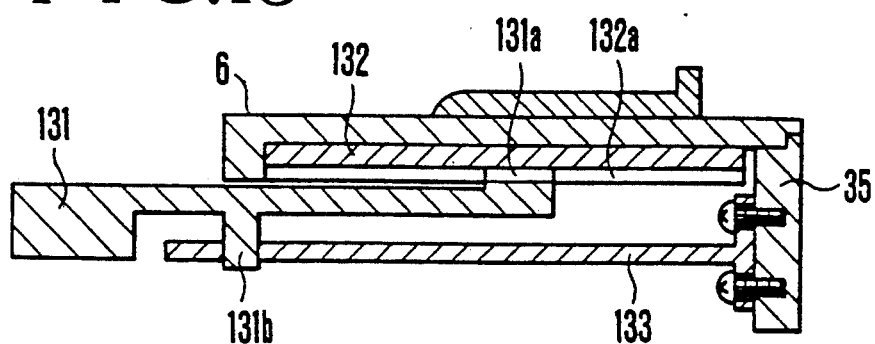

The invention is not limited to the arrangements of the embodiments described. The invention may be changed in various manners, including for example:

(a) In the embodiment described, the means for driving the first lens group in the direction of the optical axis is formed by the cam ring 5, the pin 10 erected on the lens barrel 1 and the straight movement guide 6. However, this arrangement may be replaced with the following arrangement: As shown in FIG. 16, for example, a known male helicoid 131a is formed in the rear part of the first-group lens barrel 131. Meanwhile, a helicoid tube 132 having a female helicoid 132a is disposed on the inner side of the straight movement guide 6. To prevent the lens barrel 131 from rotating, a rotation stopper 133 which is slidable over a dowel 131b protruding from the lens barrel 131 is secured, for example, to the gear carrying plate 35.

Figure 17:
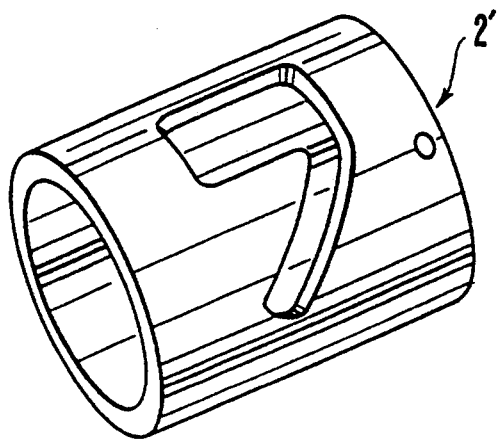
Figure 18:
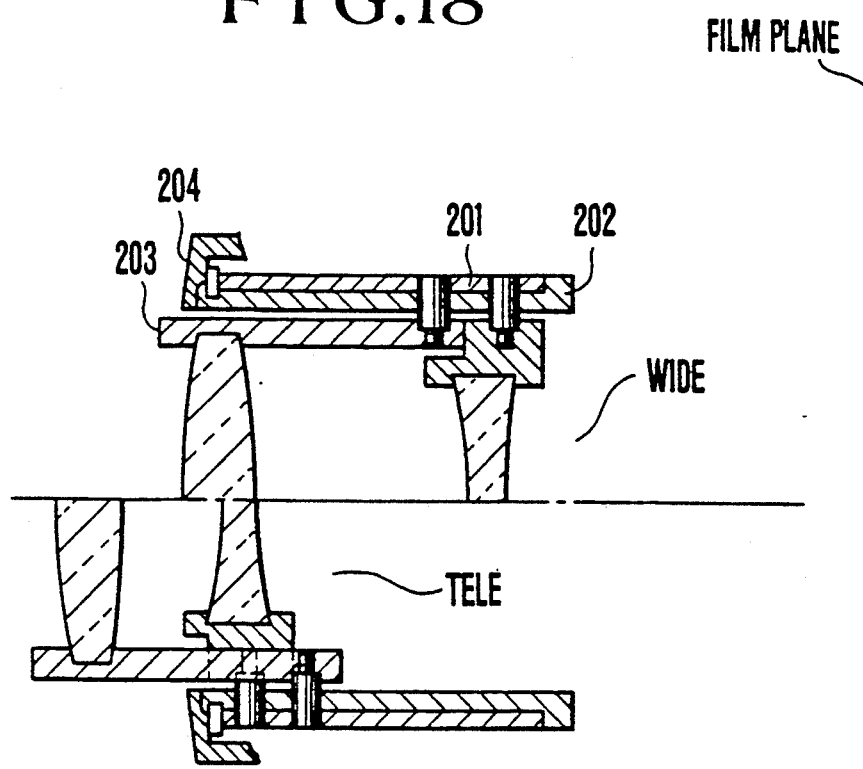
FIGS. 18 to 22 show the lens barrel retracting mechanism of the conventional zoom camera.
Figure 19:
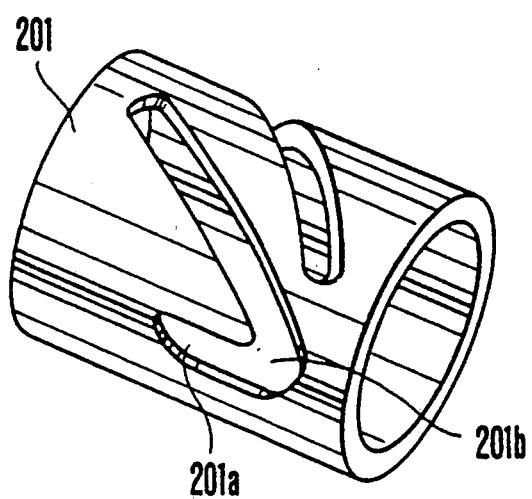
Figure 20:
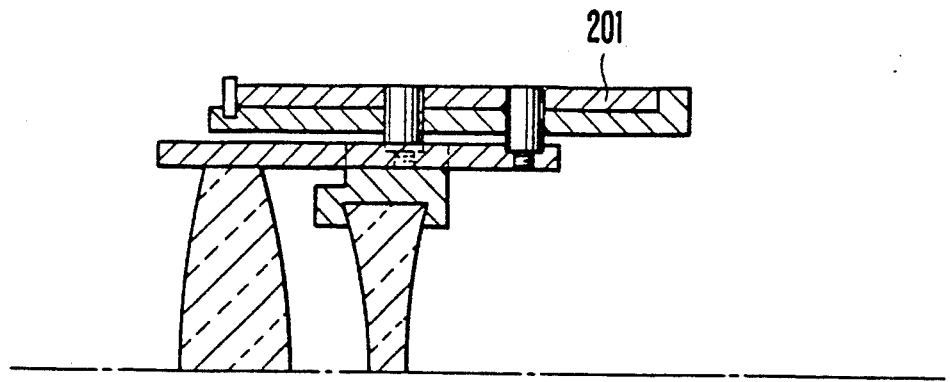
Figure 21:
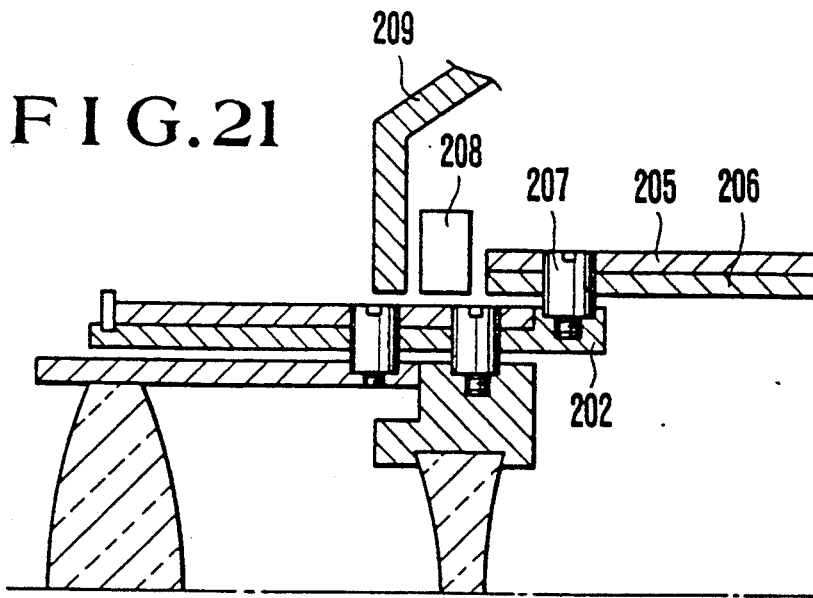
Figure 22:
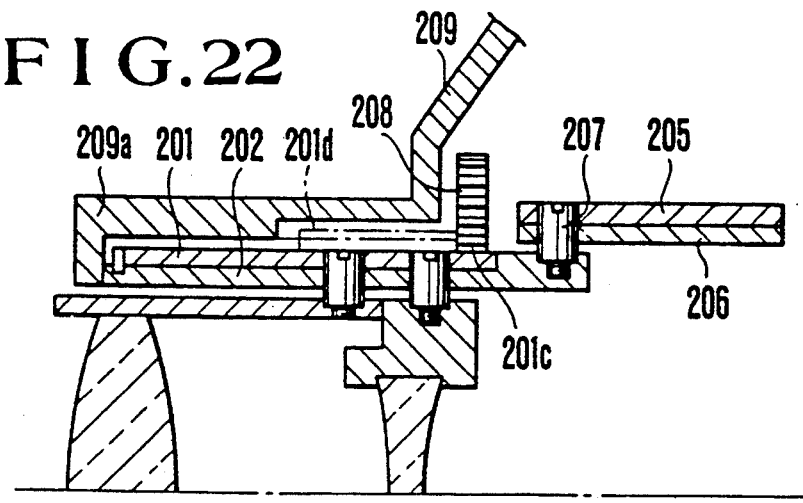

(b) The second-group cam ring 2 may be replaced with a cam ring 2' which is formed by cutting out a part of a cylinder in a manner as shown in FIG. 17. The use of the cam ring 2' is preferable for improvement in the strength of the cam ring.

(c) The stepper motor 190 which is employed as a motor for driving the third lens group may be replaced with a DC motor. The rotating degree of the DC motor is controlled by detecting it by known detecting means such as a pulse plate.

Further, in the case of embodiments described, the invention is applied to a zoom optical system. However, the invention is of course likewise applicable also to other multi-focal-length optical systems and mono-focal-length optical systems. Further, the optical systems to which this invention is applicable are of course not limited to photo-taking optical systems.

In accordance with the arrangement of embodiments described, the lens barrel unit can be stowed into the camera body in a very compact state. Therefore, the invented lens barrel retracting device permits reduction in thickness and size of a camera.

What is claimed is:

1. An optical apparatus including a lens barrel retracting device for a camera having a camera body, said apparatus comprising:
   a) a first photo-taking optical system;
   b) first optical system holding means for carrying said first photo-taking optical system, said first optical system holding means being arranged to be retractably displaceable relative to the camera body;
   c) a second photo-taking optical system;
   d) second optical system holding means for displaceably carrying said second photo-taking optical system, said second optical system holding means being arranged to be displaceable in unison with said first optical system holding means;
   e) a third photo-taking optical system;
   f) third optical system holding means for displaceably carrying said third photo-taking optical system, said third optical system holding means being arranged to be displaceable in unison with said second optical system holding means; and
   g) operating means arranged to cause said first optical system holding means to be retracted and displaced and to cause said second and third photo-taking optical systems to be displaced respectively relative to said second and third optical system holding means to perform a retracting action.

2. The apparatus according to claim 1, wherein said first optical system holding means comprises a first cam member which shifts said first photo-taking optical system in the optical axis direction, and said second optical system holding means comprises a second cam member which shifts said second photo-taking optical system in the optical axis direction, said second cam member being formed as a separate member from said first cam member.

3. The apparatus according to claim 1, wherein said third optical system holding means comprises a shifting mechanism, which in response to a rotating force of a motor as a driving source, moves in the optical axis direction relative to said second photo-taking optical system.

4. The apparatus according to claim 3, wherein said motor is held by said second optical system.

5. An optical apparatus including a lens barrel retracting device for a camera having a camera body, said apparatus comprising:
   a) a first photo-taking optical system;
   b) a second photo-taking optical system;
   c) a third photo-taking optical system;
   d) first holding means for holding said first photo-taking optical system;
   e) second holding means for holding said first photo-taking optical system;
   f) third holding means for holding said first photo-taking optical system;
   g) a driving means which forcibly shifts said first, second, and third holding members toward the camera body; and
   h) a transmission member for transmitting a rotating force from a drive source to said driving member, said transmission member being positioned at a position radially inside said first holding means and radially outside said third holding means.

6. The apparatus according to claim 5, wherein said driving member shifts said first, second, and third holding means toward said camera body by movement in the optical axis direction.

7. The apparatus according to claim 6, wherein said transmission member comprises a rotatable screw member, and said driving member comprises a portion formed to engage with said screw member.

8. The apparatus according to claim 5, wherein said second holding means comprises a shutter member arranged therewith.

9. An optical apparatus including a lens barrel retraction device for a camera having a camera body, said apparatus comprising:
   a) a first photo-taking optical system;
   b) a second photo-taking optical system;
   c) a third photo-taking optical system;
   d) first holding means for holding said first photo-taking optical system;
   e) second holding means for holding said second photo-taking optical system;
   f) third holding means for holding said third photo-taking optical system;
   g) a driving member which forcibly shifts said first, second, and third holding means toward said camera body;
   h) a first cam member for shifting said first photo-taking optical system in the optical axis direction, to effect a zooming operation;
   i) a second cam member for shifting said second photo-taking optical system in the optical axis direction to effect a zooming operation, said second cam member being separately formed from said first cam member; and
   j) a shifting mechanism for shifting said third photo-taking optical system in the optical axis direction to effect a focusing operation.

10. The apparatus according to claim 9, wherein said first and second cam members are each in the form of a cylinder having a cam formed on the circumferential surface.

11. The apparatus according to claim 9, wherein said first cam member rotates with receipt of the rotation of said drive source, and said second cam member rotates in response to the rotation of said first cam member.

12. The apparatus according to claim 9, wherein said shifting mechanism utilizes as its drive source a rotation force of a motor held by said second holding means.

13. The apparatus according to claim 9, further comprising a shutter blade movably held by said second holding means.

14. An optical apparatus including a lens barrel retracting device for a camera having a camera body, said apparatus comprising:
   a) photo-taking optical system;
   b) a cam-ring having a cam formed for shifting said optical system in the optical axis direction for performing photography;
   c) a transmission system for rotating said cam in response to the rotation of said drive source, said transmission system including a gear engageable with a gear portion formed on an inner wall of said cam-ring; and
   d) driving means for forcibly shifting said cam-ring toward the camera body.

15. The apparatus according to claim 14, wherein said optical system is shifted in the optical axis direction to effect a zooming operation.

16. The apparatus according to claim 14, further comprising a guide member for shifting said optical system only in the optical axis direction in response to the rotation of said cam-ring.

17. The apparatus according to claim 14, wherein said transmission system comprises a gear positioned outside an outer diameter of said cam-ring.

18. The apparatus according to claim 14, further comprising a second cam-ring which in response to the rotation of said cam-ring, and another photo-taking optical system which is shifted in the optical axis direction by a cam provided on said second cam-ring.

* * * * *

UNITED STATES PATENT AND TRADEMARK OFFICE
CERTIFICATE OF CORRECTION

PATENT NO. : 5,153,626

DATED : October 6, 1992

INVENTOR(S) : Yamamoto

It is certified that error appears in the above-identified patent and that said Letters Patent is hereby corrected as shown below:

On the Title Page:

[75] INVENTORS:

"Harishige Yamamoto," should read --Harushige Yamamoto,--.

[56] References Cited:

Insert: --5,043,752  8/1991  Kohmoto--.

SHEET 11 OF THE DRAWINGS:

In Fig. 12, "RETRACING" should read --RETRACTING--.

COLUMN 3:

Line 38, "invention." should read --invention:--.

COLUMN 4:

Line 56, "the," should read --the--.

COLUMN 5:

Line 33, "screwengaged" should read --screw-engaged--; and
Line 50, "thorough" should read --through--.

UNITED STATES PATENT AND TRADEMARK OFFICE
CERTIFICATE OF CORRECTION

PATENT NO. : 5,153,626

DATED : October 6, 1992

INVENTOR(S) : Yamamoto

It is certified that error appears in the above-identified patent and that said Letters Patent is hereby corrected as shown below:

COLUMN 6:

Line 49, "6F," should read --6f,--.

COLUMN 7:

Line 9, "a ,gear" should read --a gear--; and
Line 54, "respectively" should read --respectively,--.

COLUMN 8:

Line 18, "bayonet" (second occurrence) should be deleted; and
Line 68, "in to" should read --into--.

COLUMN 9:

Line 41, "strip" should read --strip 6f--.

COLUMN 11:

Line 64, "plate" should read --plate 3--.

UNITED STATES PATENT AND TRADEMARK OFFICE
CERTIFICATE OF CORRECTION

PATENT NO. : 5,153,626   Page 3 of 3
DATED : October 6, 1992
INVENTOR(S) : Yamamoto It is certified that error appears in the above-identified patent and that said Letters Patent is hereby corrected as shown below:

COLUMN 12:
 Line 37, "the" should read --this--; and
 Line 38, "ation" should read --ation is :--.

COLUMN 13:

Line 61, "member 51" should read --member 151--.

COLUMN 15:

Line 24, "first" should read --second--; and
 Line 26, "first" should read --third--.

Signed and Sealed this

Twenty-seventh Day of April, 1993

*Attest:*

MICHAEL K. KIRK

*Attesting Officer*   *Acting Commissioner of Patents and Trademarks*